(12) United States Patent
Lee et al.

(10) Patent No.: US 11,722,024 B2
(45) Date of Patent: Aug. 8, 2023

(54) INTERIOR PERMANENT MAGNET MOTOR WITH MAGNETIC FLUX GUIDING COMPONENT

(71) Applicant: LG Electronics Inc., Seoul (KR)

(72) Inventors: Jaemin Lee, Seoul (KR); Youngjun Ahn, Seoul (KR); Kilyoung Kim, Seoul (KR); Junho Lee, Seoul (KR); Jihwan Kong, Seoul (KR); Taeseok Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 17/165,329

(22) Filed: Feb. 2, 2021

(65) Prior Publication Data

US 2021/0336497 A1 Oct. 28, 2021

(30) Foreign Application Priority Data

Apr. 28, 2020 (KR) .................. 10-2020-0051545

(51) Int. Cl.
  *H02K 1/27* (2022.01)
  *H02K 1/276* (2022.01)
  *H02K 21/16* (2006.01)
  *H02K 11/215* (2016.01)

(52) U.S. Cl.
  CPC ......... *H02K 1/2773* (2013.01); *H02K 11/215* (2016.01); *H02K 21/16* (2013.01)

(58) Field of Classification Search
  CPC .... H02K 1/2773; H02K 1/276; H02K 1/2766; H02K 21/16; H02K 21/14; H02K 21/12; H02K 11/215; H02K 11/21

USPC ............. 310/68 B, 156.55, 156.56, 156.59
  See application file for complete search history.

(56) References Cited

U.S. PATENT DOCUMENTS

| | | | |
|---|---|---|---|
| 2001/0015582 A1* | 8/2001 | Nakajima | H02K 29/08 324/207.13 |
| 2012/0274185 A1* | 11/2012 | Kanemitsu | H02K 24/00 310/156.01 |
| 2014/0175957 A1 | 6/2014 | Tang et al. | |

(Continued)

FOREIGN PATENT DOCUMENTS

| | | |
|---|---|---|
| JP | 2003244918 | 8/2003 |
| JP | 2004129456 | 4/2004 |
| JP | 2016178751 | 10/2016 |

(Continued)

OTHER PUBLICATIONS

Machine translation of JP-2016178751-A. (Year: 2016).*

(Continued)

*Primary Examiner* — Michael Andrews
(74) *Attorney, Agent, or Firm* — Fish & Richardson P.C.

(57) ABSTRACT

Disclosed is an IPM motor that detects an accurate position of a rotor. The IPM motor includes a stator, a hub, a plurality of spokes extending outward in a radial direction from the hub, a plurality of slots defined between the spokes, a rotor rotatably installed in the stator, wherein the rotor includes a plurality of permanent magnets respectively arranged in the slots, a sensor disposed adjacent to the rotor, wherein the sensor is configured to detect a position of each permanent magnet, and a cover disposed on the rotor to cover the rotor, wherein the cover is constructed to guide magnetic flux of each permanent magnet to the sensor at a specific point of the slot of the rotor.

18 Claims, 8 Drawing Sheets

(56) References Cited

U.S. PATENT DOCUMENTS

2016/0285347 A1\* 9/2016 Busse-Grawitz .... H02K 11/215

FOREIGN PATENT DOCUMENTS

| JP | 2016178751 A | \* | 10/2016 |
| KR | 20160115784 | | 10/2016 |

OTHER PUBLICATIONS

Notice of Allowance in Korean Appln. No. 10-2020-0051545, dated May 9, 2022, 5 pages (with English translation).
Office Action in Korean Appln. No. 10-2020-0051545, dated Nov. 16, 2021, 10 pages (with English translation).

\* cited by examiner

INTERIOR PERMANENT MAGNET MOTOR WITH MAGNETIC FLUX GUIDING COMPONENT

CROSS-REFERENCE TO RELATED APPLICATION

This application claims the benefit of Korean Patent Application No. 10-2020-0051545, filed on Apr. 28, 2020, which is hereby incorporated by reference as when fully set forth herein.

TECHNICAL FIELD

The present disclosure relates to an interior permanent magnet or internal permanent magnet (IPM) motor, and more particularly, to a rotor of the IPM motor.

BACKGROUND

A motor is generally an electric device that converts electrical energy into mechanical energy. The motor may generate a rotational force, that is, a torque by an interaction between a magnetic field and a current, and rotate a driving shaft of the motor using the generated torque. More specifically, the motor may be composed of a stator and a rotor that rotates relative to the stator. The stator and the rotor may be provided with components, for example, a magnet or a winding, for generating magnetic and electric fields.

Such motors may be classified into various types based on structures and principles thereof. Among these, a permanent magnet (PM) motor may have a rotor to which a permanent magnet is applied instead of the winding to form the magnetic field, and may not have to provide the current to the winding, thereby achieving high efficiency and low maintenance cost. In more detail, the PM motor may be classified into a surface permanent magnet (SPM) motor and an interior permanent magnet or internal permanent magnet (IPM) motor. In the SPM motor, the permanent magnet is attached to a surface of the rotor. Further, in the IPM motor, the permanent magnet is placed inside the rotor. Because the permanent magnet is firmly fixed inside the rotor, the IPM motor may have high durability and may enable high speed rotation and large torque. Therefore, the IPM motor is widely used in various devices because of such advantages.

Like other types of motors, such an IPM motor may detect the rotation of the rotor to control an operation. A position of a specific point of the rotor needs to be detected to detect the rotation. Because the permanent magnet generates the magnetic field, a position of such permanent magnet may be specified by measuring an intensity, that is, a magnetic flux, of the magnetic field. Based on the specified position of the permanent magnet, the rotation and positions relative to the stator of the rotor may be detected. Therefore, the position of the permanent magnet needs to be accurately detected to operate the motor efficiently.

SUMMARY

The present disclosure was devised to solve the above-described problem, and a purpose of the present disclosure is to provide an IPM motor that accurately detects a position of a specific point of a rotor.

To achieve the above or other purposes, particular implementations of the present disclosure provides an interior permanent magnet (IPM) motor that includes a stator, a rotor, a sensor, and a cover. The rotor may be configured to rotate with respect to the stator. The rotor may include a hub, a plurality of spokes that extend outward in a radial direction from the hub, a plurality of slots that are defined between the plurality of spokes, and a plurality of permanent magnets that are disposed in the plurality of slots, respectively. The sensor may be disposed adjacent to the rotor and may be configured to detect a position of each of the plurality of permanent magnets. The cover may at least partially cover the rotor and may be configured to guide, based on rotation of the rotor with respect to the stator, magnetic flux of each of the plurality of permanent magnets toward the sensor.

In some implementations, the IPM motor can optionally include one or more of the following features. The cover may be configured to, based on rotation of the rotor with respect to the stator, (i) guide the magnetic flux of each of the plurality of permanent magnets from a first part of the each of the plurality of permanent magnets toward the sensor and (ii) divert the magnetic flux of the each of the plurality of permanent magnets from a second part of the each of the plurality of permanent magnets away from the sensor. The second part may be different from the first part. The cover may face the sensor and be disposed between the sensor and the rotor. The cover may be disposed at a circumferential edge of the rotor and extend along a circumferential direction. The cover may include a plurality of windows that correspond to the plurality of permanent magnets, respectively. Each of the plurality of windows may include a frame and an opening. The frame may include a magnetic material and may be configured to induce, away from the sensor, a path of the magnetic flux of a permanent magnet that corresponds to the window. The opening may be defined in the frame and configured to pass, toward the sensor, the magnetic flux of the permanent magnet that corresponds to the window. The plurality of windows may be disposed on center lines of the plurality of slots, respectively, that extend in the radial direction. The cover may include a plurality of bridges. Each of the plurality of bridges may be disposed on a permanent magnet that corresponds to the bridge, and extends, in a circumferential direction, from a window that corresponds to the bridge. Each of the plurality of bridges may include the magnetic material, and be configured to induce, away from the sensor, magnetic flux of at least a portion of a permanent magnet that is spaced apart from the bridge. The sensor may be configured to move relative to the rotor along a path that is defined based on rotation of the rotor. The plurality of windows and the plurality of bridges may be disposed along the path. Each of the plurality of bridges may include first and second bridge portions that are arranged at opposite sides of a window that corresponds to the bridge, and that extend, in the circumferential direction, toward opposite sides of a permanent magnet that corresponds to the bridge. The cover may include a plurality of yokes. Each of the plurality of yokes may extend, in the circumferential direction, on a spoke that corresponds to the yoke and that is connected to two adjacent bridges. Each of the plurality of yokes may define a hole that is aligned with a through hole that is defined in a spoke that corresponds to the yoke. The opening of each of the plurality of windows may be defined at a position between (i) a first point that corresponds to ¾ of a radial length from an innermost end of a corresponding permanent magnet and (ii) a second point that corresponds to an outermost end of the corresponding permanent magnet. The opening of each of the plurality of windows may have a width of less than 1.5 mm in the circumferential direction. Each of the plurality of bridges may have a width of less than 1.5 mm in the radial direction. Each of the plurality of yokes may partially expose opposite lateral sides of a corresponding spoke in the circumferential direction. The stator may circumferentially surround the rotor. The plurality of spokes may be equally spaced apart from each other in a circumferential direction. The IPM motor may include a driving shaft that is connected to the hub. The sensor may include a hall sensor.

To achieve the above or other purposes, the present disclosure may provide an IPM motor including a stator, a hub, a plurality of spokes extending outward in a radial direction from the hub, a plurality of slots defined between the spokes, a rotor rotatably installed in the stator, wherein the rotor includes a plurality of permanent magnets respectively arranged in the slots, a sensor disposed adjacent to the rotor, wherein the sensor detects a position of each permanent magnet, and a cover disposed on the rotor to cover the rotor, wherein the cover guides magnetic flux of each permanent magnet to the sensor at a specific point of the slot of the rotor.

The cover may divert the magnetic flux of each permanent magnet from the sensor at points other than the specific point of the slot. Further, the cover may face the sensor and may be interposed between the sensor and the rotor. Further, the cover may be disposed at a distal end in the radial direction of the rotor and continuously extend along a circumferential direction.

More specifically, the cover may include each window disposed on each permanent magnet, and each window may include a frame made entirely of a magnetic material and constructed to induce a path of the magnetic flux of each permanent magnet to be away from the sensor, and an opening defined in the frame to pass the magnetic flux of each permanent magnet toward the sensor without interference. The window may be disposed on a center line in the radial direction of the slot.

The cover may include each bridge disposed on each permanent magnet and extending from sides of each window in a circumferential direction of the rotor. Each bridge may be made entirely of the magnetic material, and may induce magnetic flux of a portion of the adjacent permanent magnet to be away from the sensor. The sensor may move along a path on the rotor while the rotor rotates, and each window and each bridge may be arranged along the path on the rotor. More specifically, each bridge may include first and second bridges respectively arranged at the both sides of the window and respectively extending to both sides of each permanent magnet in the circumferential direction of the rotor.

The cover may include each yoke extending along the circumferential direction of the rotor on each spoke and connected to two adjacent bridges. Each yoke may include a hole defined therein in communication and alignment with a through hole defined in each spoke.

The opening of each window may be defined at a position between a point corresponding to ¾ of a total length in the radial direction from an innermost distal end in the radial direction of the permanent magnet and a point corresponding to an outermost distal end in the radial direction of the permanent magnet. A width in a circumferential direction of the opening of each window may be less than 1.5 mm, and a width in the radial direction of each bridge may be less than 1.5 mm. Further, each yoke may partially expose both sides in the circumferential direction of each spoke.

An additional range of applicability of examples described in the present disclosure will become apparent from a detailed description below. However, various changes and modifications within the spirit and scope of the present disclosure may be clearly understood by those skilled in the art, and thus, configurations of the detailed description should be understood as being given as examples only.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

Figure 1:
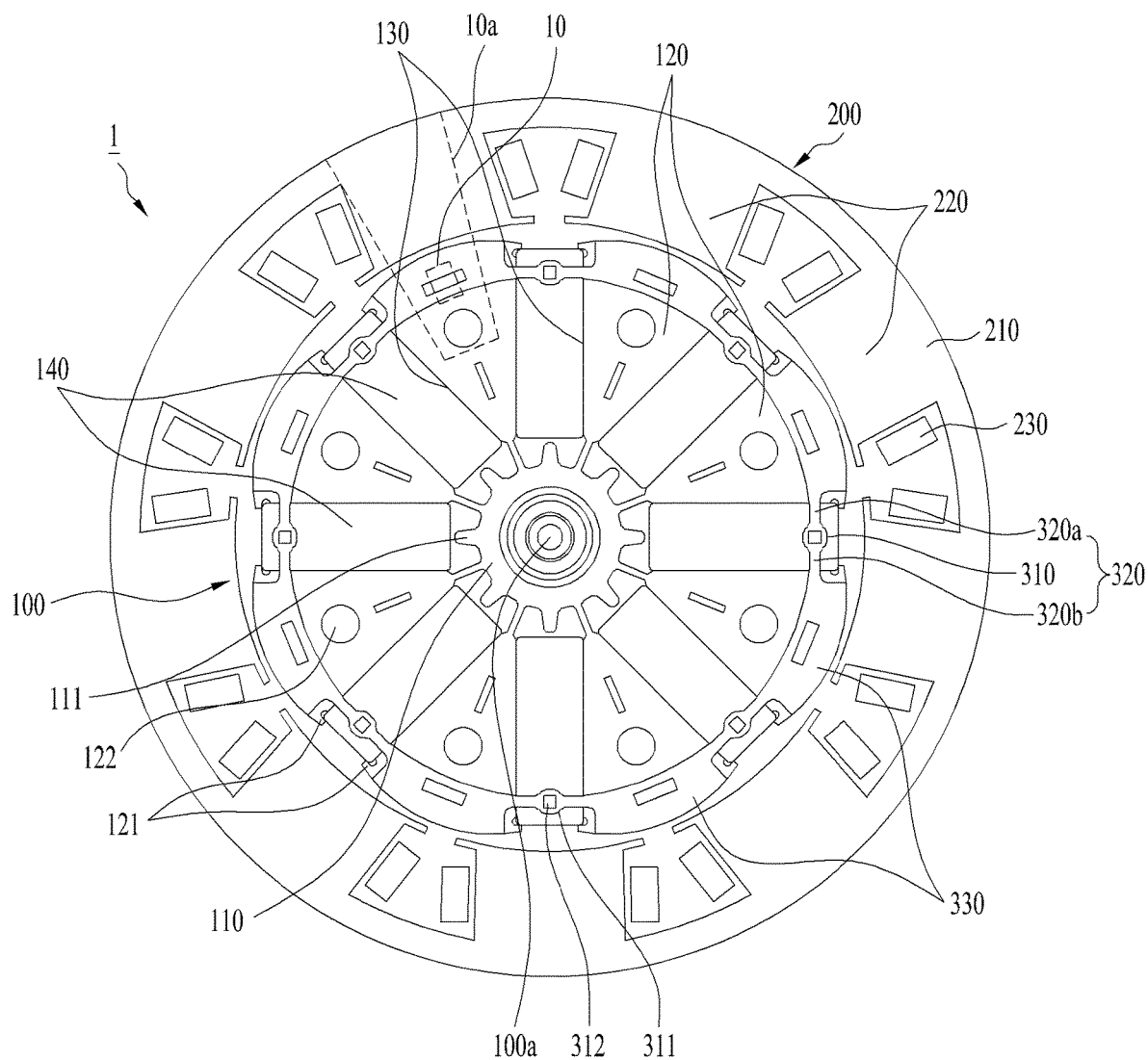
FIG. 1 is a plan view showing an IPM motor according to the present disclosure.

Hereinafter, an IPM Motor according to the present disclosure will be described in detail with reference to the accompanying drawings.

In the following description, the same or similar elements are denoted by the same reference numerals even though they are depicted in different drawings and redundant descriptions thereof will be omitted. With respect to elements used in the following description, the suffixes "module" and "unit" are used or combined with each other only in consideration of ease in the preparation of the description, and do not have or serve as different meanings. Accordingly, the suffixes "module" and "unit" may be interchanged with each other. In addition, in the following description, a detailed description for known functions and configurations incorporated herein will be omitted when it may make the subject matter disclosed in the present disclosure rather unclear. In addition, the accompanying drawings are provided only for a better understanding of the examples in the present disclosure and are not intended to limit the technical concept in the present disclosure. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present disclosure, it will be further understood that the terms "comprises", includes," etc. specify the presence of stated features, numbers, steps, operations, elements, components, or combinations thereof, but do not preclude the presence or addition of one or more other features, numbers, steps, operations, elements, components, or combinations thereof. Further, for the same reasons, the present disclosure also covers any sub-combination excluding some features, integers, steps, operations, elements, or components from any predefined combination.

Examples described in the present disclosure are related to a detailed structure of an IPM motor. However, principles and configurations of the examples described may be applied to other types of motors without substantial modification.

Figure 2:
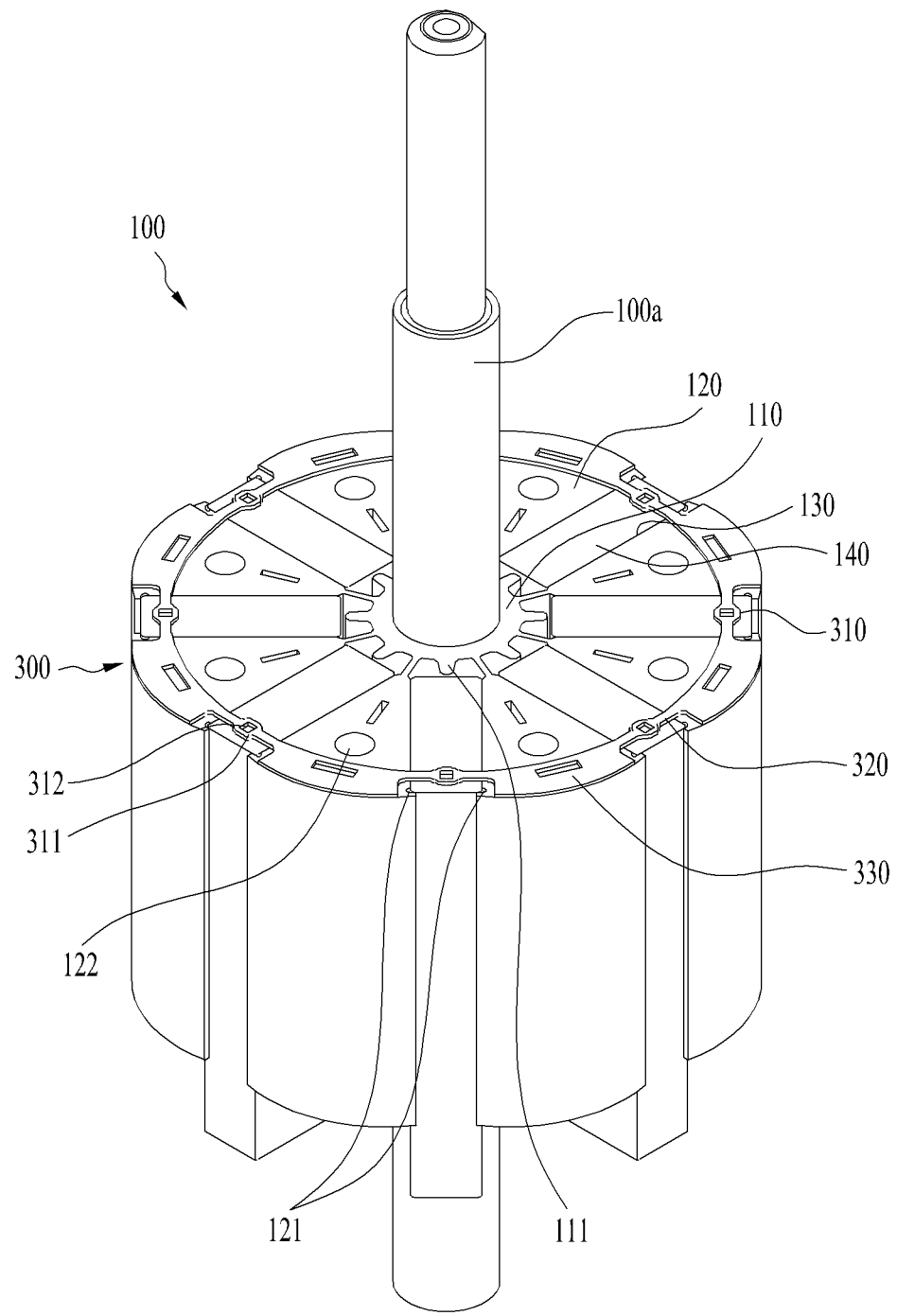
FIG. 2 is a perspective view showing an IPM motor according to the present disclosure.
Figure 3:
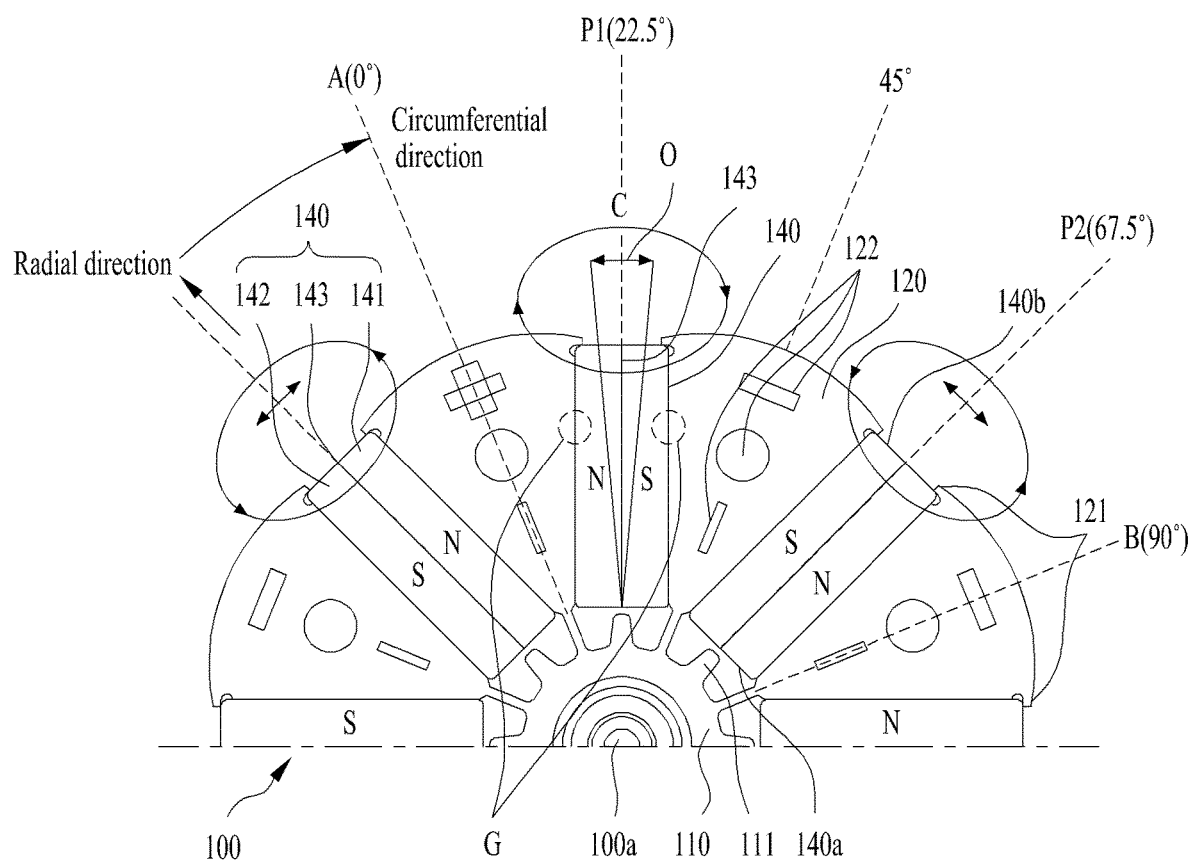
FIG. 3 is a partial plan view showing a rotor of an IPM motor in detail.

First, an overall configuration of an example of the IPM motor described in the present disclosure will be described below with reference to related drawings. FIG. 1 is a plan view showing an IPM motor according to the present disclosure. FIG. 2 is a perspective view showing an IPM motor according to the present disclosure. Further, FIG. 3 is a partial plan view showing a rotor of an IPM motor in detail. Referring to these drawings, the configuration of the IPM motor will be described as follows.

An IPM motor 1 (hereinafter, simply a motor 1) according to the present disclosure may be composed of a stator 200 and a rotor 100 constructed to rotate relative to the stator 200.

First, the rotor 100 may be surrounded by the stator 200, and thus may be disposed in the stator 200 in a manner rotatable with respect to a center of the stator 200. That is, the illustrated motor 1 may correspond to an inner rotor type motor which is advantageous for directly rotating a mechanical component connected to a driving shaft thereof. In addition, as shown, the rotor 100 has a plurality of spokes. Accordingly, the illustrated motor 1 may correspond to a spoke type motor. Such spoke type motor 1 may concentrate a magnetic flux generated by a permanent magnet, and may be advantageous in improving a performance. However, the motor 1 may be in different types from those shown, and embodiments according to the present disclosure may be equally applied to these different types.

More specifically, the rotor 100 may include a hub 110 and a plurality of spokes 120 extending radially outward from the hub 110. The hub 110 may include a through hole defined at a center thereof, and a driving shaft 100*a* of the motor 1 may be inserted into the through hole. Therefore, when the rotor 100 is rotated, the driving shaft 100*a* may be rotated together.

The plurality of spokes 120 may be arranged to be spaced apart from each other at equal spacing along a circumferential direction of the rotor 100. In addition, a plurality of slots 130 may be defined between the spokes 120 by such arrangement. That is, the slot 130 may be defined between a pair of adjacent spokes 120. Accordingly, the spokes 120 and the slots 130 may be arranged alternately with each other along the circumferential direction of the rotor 100.

In addition, the rotor 100 may include a plurality of permanent magnets 140 respectively arranged in the slots 130. The permanent magnet 140 generates a magnetic field of a predetermined intensity, that is, the magnetic flux. Such magnetic flux may apply a rotational force of a predetermined magnitude, that is, a torque to the rotor 100 together with an electric field formed by the stator 200. More specifically, as shown well in FIG. 3, the permanent magnet 140 may have a body extending in the radial direction of the rotor 100, for example, a column shape of a rectangular cross-section, and may be fitted in the slot 130 so as not to move. In order to generate constant magnetic flux for stable rotation of the rotor 100, the permanent magnets 140 have a constant size. Similarly, the slots 130 may also have a certain size, that is, a size corresponding to the permanent magnet 140 in order to stably accommodate the permanent magnets 140 therein, respectively. Further, in order to prevent separation of the permanent magnet 140 during the rotation of the rotor 100, the rotor 100 may additionally include support mechanism configured to hold the permanent magnet 140. For example, as shown in FIG. 3, the hub 110 may include a first projection 111 disposed in the slot 130 and extending in a radial direction of the rotor 100 from an outer circumferential face of the slot 130. The first projection 111 may extend to an innermost surface 140*a* in the radial direction of the permanent magnet 140, and thus may support the permanent magnet 140 while in contact with the surface 140*a* thereof. Further, the spoke 120 may include second projections 121 respectively extending from both side faces of the spoke 120 in the circumferential direction of the rotor 100. The second projections 121 may latch on an outermost surface 140*b* in the radial direction of the permanent magnet 140. Accordingly, the permanent magnet 140 may be stably supported so as not to be separated from the slot 130 by the first and second projections 111 and 121.

Each of the permanent magnets 140 may include, in more detail, an N-pole portion 141 and an S-pole portion 142 extending in the radial direction. The N-pole portion and the S-pole portion 141 and 142 are arranged parallel to each other, and accordingly, a boundary 143 may be formed therebetween. The N-pole portion and the S-pole portion 141 and 142 are arranged to abut with each other on the boundary 143. The boundary 143 may be disposed on a center line extending in a longitudinal direction of the permanent magnet 140 or in the radial direction of the rotor 100. Therefore, each permanent magnet 140 may form a magnetic field that starts from the N-pole portion 141 and extends to the S-pole portion 142, as shown by an arrow in FIG. 3, and the magnetic flux may not be substantially generated at the boundary 143. In addition, as shown well in FIG. 3, the same pole portions (that is, the N-pole portion/the N-pole portion or the S-pole portion/the S-pole portion) may be arranged in portions of the two adjacent permanent magnets 140 facing away from each other to generate a continuous torque by magnetic fields in opposite directions.

Referring to FIG. 1, the stator 200 may be disposed to surround the rotor 100, as described above. More specifically, the stator 200 may include a ring-shaped base 210 and a plurality of teeth 220 extending radially inward from the base 210 toward the rotor 100. The teeth 220 may accurately face the spokes 120 of the rotor 100 and the permanent magnets 140. In addition, in order to form an electric field, wires are wound around each tooth 220 to form windings 230.

In one example, in order to apply an intended constant torque to the rotor 100 in the motor, a current for electric field formation needs to be supplied to the stator 200 at an appropriate time in consideration of the rotation or amount of rotation of the rotor, that is, a relative position of the rotor 100 with respect to the stator 200. Accordingly, the motor 1 may include a sensor 10 for detecting the rotation of the rotor 100, precisely, the amount of rotation of the rotor 100, as shown in FIG. 1. More specifically, the sensor 10 may be directly attached to a housing accommodating the rotor 100 and the stator 200 therein or may be installed in the housing using a support 10a as shown. The sensor 10 may be disposed adjacent to the rotor 100 to detect the amount of rotation of the rotor 100. For example, as shown, the sensor 10 may be disposed on a top face or a bottom face of the rotor 100, that is, on a surface of the rotor 100 that is substantially perpendicular to a rotation shaft.

Because the amount of rotation of the rotor 100 may be determined by a distance that any one point or portion of the rotor 100 has moved in the circumferential direction, the sensor 10 basically needs to detect a position of the specific point or portion of the rotor 100 to detect such amount of rotation. As described above, the permanent magnets 140 may generate the magnetic fields and may be arranged at the equal spacing in the circumferential direction of the rotor 100. Thus, the position of such permanent magnet 140 may be detected as the specific point of the rotor 100 for determining the amount of rotation by measuring the intensity of the magnetic field, that is, the magnetic flux. In addition, while the permanent magnet 140 has the magnetic flux gradually changing at the N-pole portion 141 and the S-pole portion 142, the permanent magnet 140 does not generate the magnetic flux at the boundary 143. Thus, the boundary 143 may be advantageous in accurately specifying the position of the permanent magnet 140. Further, as described above, because the slot 130 is defined to have a geometric shape matching the permanent magnet 140, the boundary 143 also matches a center line C extending in the longitudinal direction or the radial direction of the slot 130, as shown in FIG. 3. In practice, because the slot 130 is defined by the spoke 120 that is not deformed because of high intensity, the slot 130 may have a shape that is not easily deformed likewise. Accordingly, the exact position of the rotor 100 may be constantly shown. Accordingly, the boundary 143 of the permanent magnet 140 may represent the center line C of the slot 130 corresponding to the exact position of the rotor 100. In order to detect such a permanent magnet 140, precisely the boundary 143 thereof, as the specific position of the rotor 100, the sensor 10 may be configured to detect the magnetic flux and a change thereof, and may be formed, for example, as a hall sensor. The hall sensor, which is a sensor that uses a hall effect, may output a change in the magnetic field or the magnetic flux as an electrical signal.

However, referring to FIG. 3, a clearance G of a predetermined size may be generated between each side face of the permanent magnet 140 and the spoke 120 adjacent thereto. For example, such clearance G may be generated by an assembly tolerance of the permanent magnet 140 as well as dimensional tolerances of the spoke 120 and/or the permanent magnet 140. Because of such tolerance G, the center line or the boundary 143 of the permanent magnet 140 may have an offset O of a predetermined size with respect to the center line C of the slot 130, and thus, may not coincide with the center line C of the slot 130. In addition, such offset O may be different for each of the permanent magnets 140. Accordingly, the change in the magnetic flux sensed by the magnetic flux sensor 10, precisely a magnetic flux value representing the boundary 143, may also be offset from the center line C of the slot 130, and may not be able to exactly represent the specific position of the rotor 100. Furthermore, when the boundary 143 having such an offset O is used, the motor 1 is not able to be controlled accurately to apply the constant torque to the rotor 100.

For this reason, the motor 1 according to the present disclosure may include a cover 300 that allows the sensor 10 to detect the specific position of the slot 130, for example, the center line C of the slot 130 or a point on such center line C as the exact specific position of the rotor 100, instead of the position of the permanent magnet 140. Such cover 300 will be described in detail below with reference to related drawings.

Figure 4:
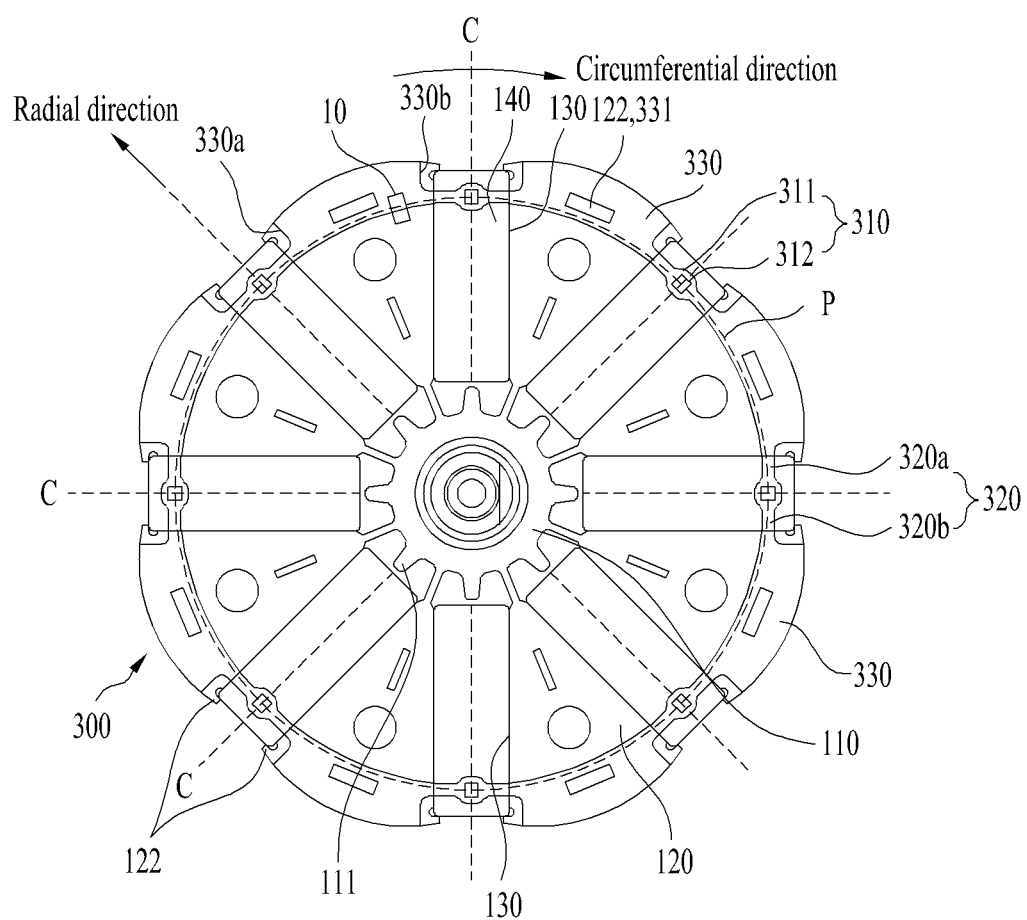
FIG. 4 is a plan view showing a rotor provided with a cover.
Figure 5:
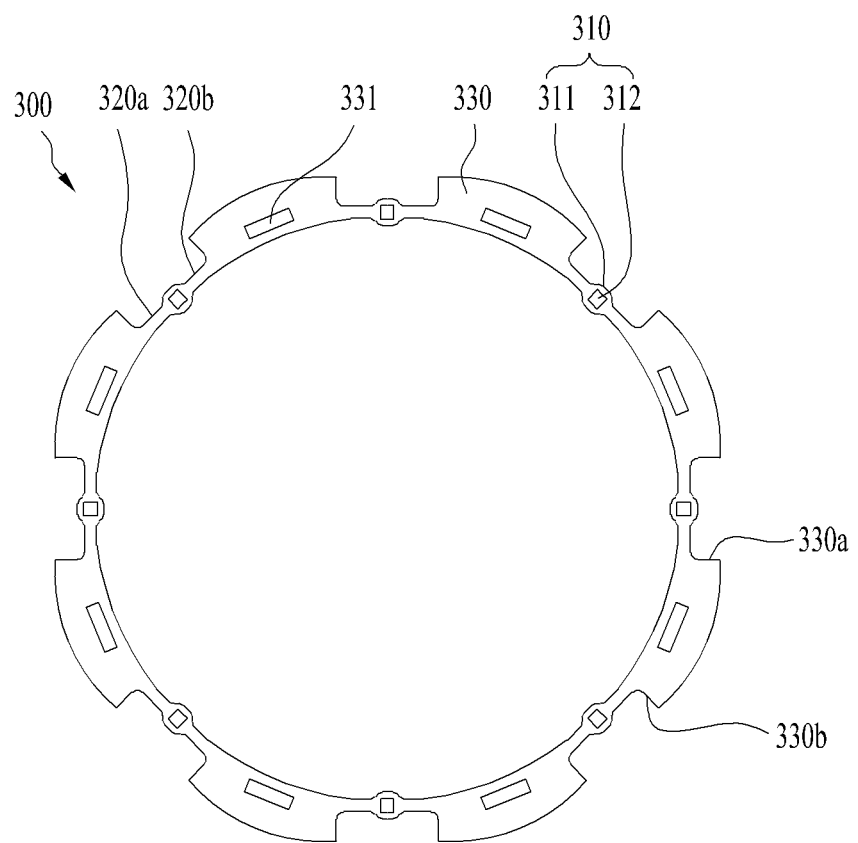
FIG. 5 is a plan view showing a cover in detail.
Figure 6:
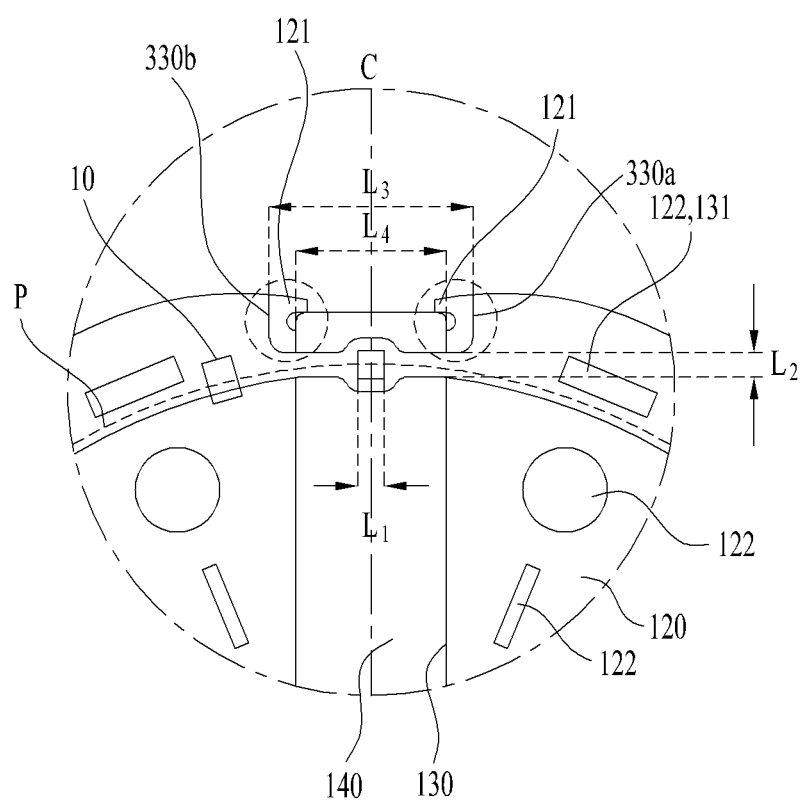
FIG. 6 is a partial plan view showing structures of a rotor and a cover in detail.

FIG. 4 is a plan view showing a rotor provided with a cover. FIG. 5 is a plan view showing a cover in detail. Further, FIG. 6 is a partial plan view showing structures of a rotor and a cover in detail. Because the above-referenced FIGS. 1 to 3 also include a structure of the cover 300, FIGS. 1 to 3 are referred together with FIGS. 4 to 6 below.

The cover 300 may include a window 310 disposed on the permanent magnet 140. The window 310 may include a frame 311 having a predetermined size and an opening 312 defined in the frame 311. The window 310, that is, the frame 311 and the opening 312 may be disposed at a certain position of the slot 130 that actually accommodates the permanent magnet 140 therein.

The frame 311 may be entirely made of a magnetic material (or a magnetic body). The magnetic material may be generally magnetized in a magnetic field and form an own magnetic field. The frame 311, which is the magnetic body, is magnetized by the adjacent permanent magnet 140 to independently form the magnetic field. Such formed magnetic field may interfere with the magnetic field of the permanent magnet 140. Thus, the frame 311 may be constructed to divert, from an original path, the magnetic flux of the permanent magnet 140, precisely, of a portion of the permanent magnet 140 adjacent to the frame 311. More specifically, the frame 311 may be constructed to induce, by the magnetic field and the magnetic flux thereof, a path of the magnetic flux of the permanent magnet 140 to be away from the original path. Thus, the frame 311 may be constructed to divert, from an original path, the magnetic flux of the permanent magnet 140, precisely, of a portion of the permanent magnet 140 adjacent to the frame 311. More specifically, the frame 311 may be constructed to induce, by the magnetic field and the magnetic flux thereof, a path of the magnetic flux of the permanent magnet 140 to be away from the original path. That is, the path of the magnetic flux of the permanent magnet 140 may be guided to be away from the sensor 10 by the frame 311. For this reason, the sensor 10 may become unable to detect the magnetic flux of original size and direction of the permanent magnet 140 by the frame 311. In a following description, the magnetic flux of the original size and direction, that is, "original magnetic flux" of the permanent magnet 140 is used to mean actual magnetic flux generated by the permanent magnet 140 when there is no interference.

On the other hand, the opening 312 does not contain any other interfering material as well as the magnetic material such as the frame 311. Therefore, the opening 312 may be defined not to interfere with the magnetic flux of the permanent magnet 140, and to pass the magnetic flux of the original size and direction (e.g., the original magnetic flux) of the permanent magnet 140 toward the sensor 10 as it is without change. For this reason, the sensor 10 may detect the original magnetic flux of the permanent magnet 140 at least at the position of the opening 312. Unlike the frame 311, the sensor 10 may detect the original magnetic flux of the permanent magnet 140 only through such opening 312. Thus, the opening 312 may indicate the specific position of the rotor 100 (or the permanent magnet 140). Further, the sensor 10 may accurately detect the specific position of the rotor 100, for example, the position of the permanent magnet 140 by detecting the original magnetic flux of the permanent magnet 140. Based on such accurate detection, the current may be supplied to the stator 200 to form the electric field at an appropriate time point, and the constant torque may be applied to the rotor 100 without interruption. Therefore, while performance and efficiency of the motor 1 are greatly increased, noise of the rotor 100 caused by unstable torque supply may be greatly reduced.

In addition, the window 310 may be disposed on the center line C of the slot 130 consistently indicating the exact position of the rotor 100 (or the permanent magnet 140), as shown well in FIGS. 4 and 6. That is, the window 310 may be disposed at a point at the same distance in the circumferential direction from side faces of the spokes 120 abutting the slot 130. Accordingly, at least the opening 312 of the window 310 may be likewise defined in such center line C. Thus, the opening 312 may represent the center line C (precisely, a point on such center line C), and may detect the more accurate position of the rotor 100, that is, the center line C by detecting the original magnetic flux of the permanent magnet 140 that has passed through the opening 312. In addition, because the opening 312 has a predetermined size, even when the offset O is present, the boundary 143 of the permanent magnet 140 may still be present in the opening 312 defined in the center line C. As mentioned above, because a sudden change in the magnetic flux, that is, absence of the magnetic flux, occurs at the boundary 143, the center line C, that is, the specific positions of the rotor 100 and the permanent magnet 140 may be more accurately specified based on such a sudden change in the magnetic flux. Furthermore, as shown in FIGS. 4 and 6, the sensor 10 is fixed to the motor 1 or the housing thereof, while the rotor 100 rotates relative to the stationary sensor 10. Therefore, the sensor 10 forms a certain trajectory or path P in the circumferential direction on the rotor 100. The window 310 may be disposed on such path P, and accordingly, the frame 311 and the opening 312 may also be arranged on the path P. Because the frame 311 and the opening 312 face directly with the sensor 10, intended manipulation of the magnetic flux may be transmitted to the sensor 10 more effectively. That is, the sensor 10 may be more affected by the magnetic flux of the permanent magnet 140 diverted by the frame 311, and the original magnetic flux of the permanent magnet that has passed through the opening 312 may be detected more accurately. Therefore, the determination of the specific position of the rotor 100 may be more clearly performed by the window 310 disposed on the path P.

Each window 310 as described above may be disposed for each permanent magnet 140, as shown in FIG. 4. Therefore, the sensor 10 may accurately detect the corresponding specific points of the rotor 100, that is, the positions of the corresponding permanent magnets 140, and the amount of rotation of the rotor 100 may be accurately determined based on these positions. In addition, the window 310, that is, the frame 311 and the opening 312 thereof, may have a rectangular shape as shown, and may have other shapes as necessary. Further, the window 310 may be coupled to the rotor 100 in various manners, and may be attached to the rotor 100 using, for example, a fastening member, an adhesive, an adhesive tape, or the like.

In addition, the cover 300 may include a bridge 320 disposed on the permanent magnet 140 like the window 310. The bridge 320 may be formed to extend in the circumferential direction of the rotor 100 from a side of the window 310, as commonly shown in FIGS. 4 to 6. Such bridge 320 may have an extending strip shape, for example.

Like the window 310, the bridge 320 may be entirely made of the magnetic material. As described with respect to the window 310 above, the bridge 320, which is the magnetic body, may also be magnetized by the permanent magnet 140 to form a magnetic field that interferes with the magnetic field of the permanent magnet 140. Thus, the bridge 320 may be constructed to divert the magnetic flux of the permanent magnet 140, precisely the portion of the permanent magnet 140 adjacent to the bridge 320, from the original path. More specifically, the bridge 320 may also be constructed to guide the path of the magnetic flux of the permanent magnet 140 to be away from the original path by the magnetic field and magnetic flux thereof. That is, the path of the magnetic flux of the permanent magnet 140 may be guided to be away from the sensor 10 by the bridge 320. For this reason, the bridge 320 makes the sensor 10 unable to detect the original magnetic flux of the permanent magnet 140 even in a region other than the window 310. Accordingly, the original magnetic flux of the permanent magnet 140 may be more clearly exposed at the opening 312 of the window 310 and may be accurately measured by the sensor 10.

In addition, as shown in FIGS. 4 and 6, the bridge 320 may be disposed in the path P of the sensor 10 formed on the rotor 100 together with the window 310. The bridge 320 directly faces the sensor 10 by such an arrangement, intended manipulation of the magnetic flux may be transmitted to the sensor 10 more effectively. That is, the sensor 10 is more affected by the magnetic flux of the permanent magnet 140 diverted from the original path by the bridge 320. Therefore, while moving along the path P relative to the rotating rotor 100, the sensor 10 becomes unable to detect the original magnetic flux of the permanent magnet 140 more reliably even in the region other than the window 310. Accordingly, the sensor 10 may accurately detect the original magnetic flux of the permanent magnet 140 that is relatively more clearly revealed in the opening 312 of the window 310.

Furthermore, when the window 310 is disposed on the center line C of the slot 130, the permanent magnets 140 may be exposed at both sides of the window 310. Accordingly, the bridge 320 may be constructed to divert the magnetic flux in a region of such exposed permanent magnet 140. In more detail, the bridge 320 includes first and second bridges 320a and 320b respectively arranged on the both sides of the window 310, more specifically, on both sides of the window 310 facing the spoke 120. The first and the second bridges 320a and 320b may respectively extend from the both sides of the window 310 to both sides of the permanent magnet 140 in the circumferential direction of the rotor 100. Therefore, such bridge 320, that is, the first and the second bridges 320a and 320b may cover the entire path P of the sensor 10 on the permanent magnet 140 together with the window 310. Accordingly, the magnetic flux of the permanent magnet 140 may be more reliably diverted from the original path so as not to be detected by the sensor 10.

Such a bridge 320 may be formed integrally with the window 310 as shown in FIGS. 4 and 5, and may be disposed for each permanent magnet 140 together. In addition, as shown, the bridge 320 may have the strip shape, and may have other shapes as necessary. In addition, the bridge 320 may also be coupled with the rotor 100 in various manners, and may be attached to the rotor 100 using, for example, the fastening member, the adhesive, the adhesive tape, or the like.

The window 310 and the bridge 320 described above may be disposed for each permanent magnet 130 as one module. However, the window 310/bridge 320 modules separated from each other as described above may not have sufficient strengths required for the rotating rotor 100. Accordingly, the cover 300 may further include a yoke 330 constructed to connect the window 310/bridge 320 modules separated from each other with each other.

The yoke 330 may be disposed in a region between the adjacent slots 130 or permanent magnets 140, that is, on the spoke 120, and may be made of the magnetic material like the window 310 and the bridge 320. In addition, the yoke 330 may extend along the circumferential direction between sides of the respective spokes 120 so as to have a length sufficient to be connected with the window 310 and the bridge 320 arranged on the slot 130 or the permanent magnet 140. The yoke 330 may be disposed for each spoke 120 and may be connected to adjacent bridges 320. Therefore, the cover 300 is made entirely of only the magnetic material, and may be formed as a single assembly in which a plurality of windows 310, bridges 320, and yokes 330 are continuously connected with each other.

Such a cover 300 is installed on the rotor 100 so as to face the sensor 10. Thus, the cover 300 may be interposed between the sensor 10 and the rotor 100. Further, as shown, the cover 300 may be disposed at a distal end in the radial direction of the rotor 100 and may be formed as a ring member continuously extending along the circumferential direction. In more detail, the cover 300 may be disposed at a distal end of the top face or the bottom face of the rotor 100, that is, the surface of the rotor 100 that is perpendicular to the rotation shaft. The cover 300 as such a single assembly may be conveniently coupled to the rotor 100 at once in various manners, for example, using the fastening member, the adhesive, and the like while having improved strength. Further, the spoke 120 may be formed of a plurality of stacked layers, and may have a through hole 122 defined therein to align and assemble such layers. The cover 300 may be also formed on the yoke 330, and may include a hole 331 defined therein communicating with the through hole 122 of the spoke 120. Accordingly, the cover 300 may be aligned with the rotor 100 using the hole 331 and the through hole 122, and may be easily and accurately coupled to the rotor 100.

As described above, the cover 300 may be disposed on the rotor 100 to cover the slots 130 and the permanent magnets 140 of the rotor 100 by the window 310 and the bridge 320, and may be constructed to guide the magnetic flux of the permanent magnet 140 to the sensor 10 only at a specific point of the slot 130 of the rotor 100, that is, only at the opening 312 of the window 310. On the other hand, the cover 300 may be constructed to divert the magnetic flux of the permanent magnet 140 from the original path, that is, the sensor 10 at points or regions other than the specific point of the slot 130. Accordingly, the sensor 10 may accurately detect the specific point of the rotor 100 by the cover 300, and the motor 1 may be accurately controlled based on the detected points.

Figure 7:
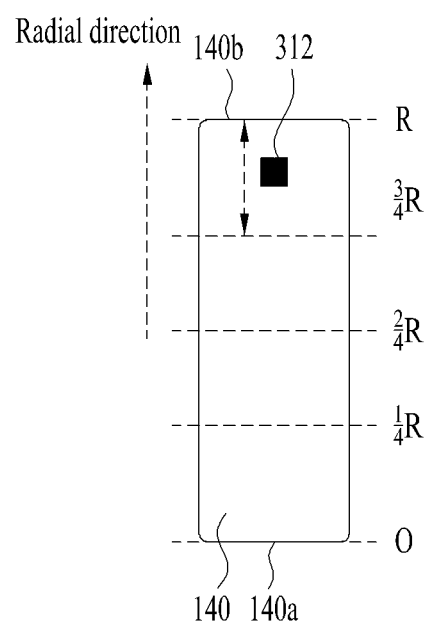
FIG. 7 is a plan view showing a geometric relationship between a permanent magnet of a rotor and a cover.

Such a cover 300 may be further optimized structurally to achieve the intended function in the present disclosure. An embodiment of such optimization will be described below with reference to the related drawings. FIG. 7 is a plan view showing a geometric relationship between a permanent magnet of a rotor and a cover. Reference will be made in conjunction with FIG. 6 for the description of the optimized embodiment.

First, as described above, the opening 312 of the window 310 needs to be sufficiently large to contain the boundary 143 of the permanent magnet 140 having the offset O. However, when the opening 312 is defined to be too large, it may be difficult to determine the position of the rotor 100 from too much magnetic flux leaked therefrom. For this reason, as shown in FIG. 6, a width L1 in the circumferential direction of the opening 312 of the window 310 is preferably set to be less than 1.5 mm.

In addition, the bridge 320 diverts the magnetic flux of the permanent magnet 140 from the original path, and the divert magnetic flux may cause a loss in the magnetic flux of the permanent magnet 140 as leakage magnetic flux. The loss of the magnetic flux may reduce the torque of the rotor 100 and output of the motor 1. Such leakage magnetic flux is proportional to the size of the bridge 320, so that the size of the bridge 320 needs to be appropriately restricted in order to prevent excessive leakage magnetic flux. Accordingly, it is preferable that a width L2 in the radial direction of the bridge 320 is set to be less than 1.5 mm.

In addition, because the yoke 330 is also made of the magnetic material, the yoke 330 may be magnetized to generate a magnetic field. When sides in the circumferential direction of the respective two yokes 330 facing away from each other are adjacent to the permanent magnet 140, such sides may be magnetized by the permanent magnet 140 to generate the leakage magnetic flux. Thus, as shown in FIG. 6, in order to reduce the possible leakage magnetic flux, sides 330a and 330b in the circumferential direction of the respective two yokes 330 facing away from each other may be respectively spaced at a predetermined spacing in the circumferential direction from the sides of the respective two spokes 120 respectively covered by the two yokes 330. That is, a distance L3 in the circumferential direction between the sides 330a and 330b of the respective two yokes 330 facing away from each other may be set to be larger than a width L4 in the circumferential direction of the permanent magnet 140. Based on such setting, the yoke 330 may be constructed to partially expose the both sides in the circumferential direction of the spoke 120. Accordingly, the yoke 330 may not generate a magnetic field adjacent to the permanent magnet 140, and accordingly, the generation of the leakage magnetic flux may be suppressed.

Furthermore, the offset O of the permanent magnet 140 is geometrically less generated at the distal end in the radial direction of the rotor 100. Therefore, it is preferable for accurate measurement that the opening 312 is also defined at such distal end in the radial direction of the rotor 100. As described above, the permanent magnet 140 is extended in the radial direction of the rotor 100. Thus, as shown in FIG. 7, it is preferable that the opening 312 of the window 310 is defined at a position between a point (¾R) (that is, a first point) corresponding to ¾ of a total length R in the radial direction from the innermost distal end 140a in the radial direction of the permanent magnet 140 and a point (that is, a second point) corresponding to the outermost distal end 140b in the radial direction of the permanent magnet 140.

Figure 8:
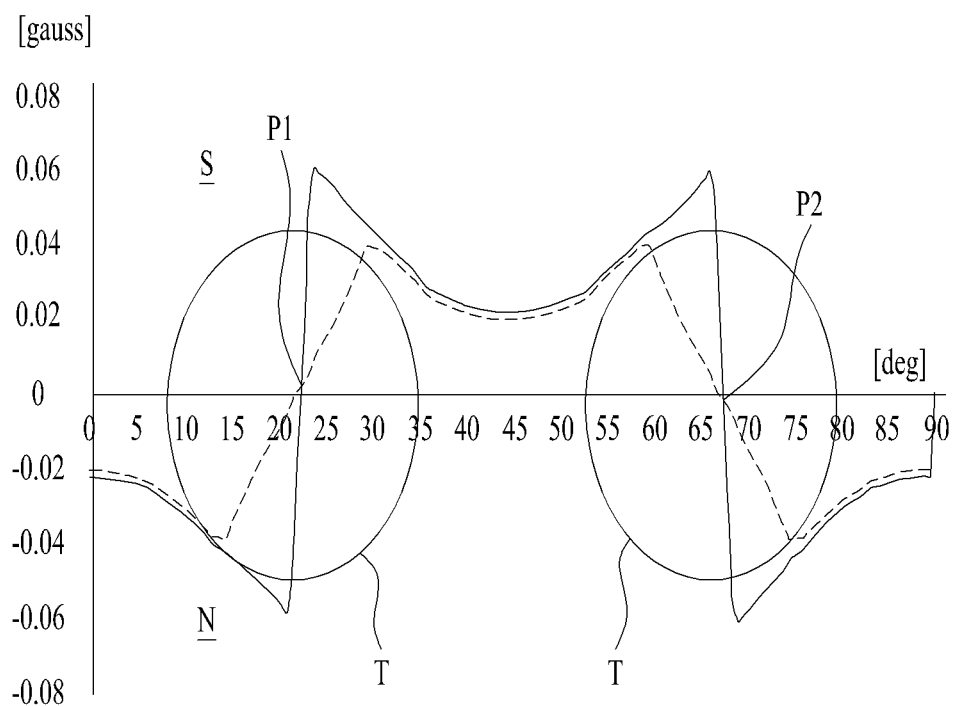
FIG. 8 is a graph showing magnetic flux measured by a sensor for an amount of rotation of a rotor in an IPM motor according to the present disclosure.

The function of the cover 300 described above may be more clearly identified from a graph shown in FIG. 8. FIG. 8 is a graph showing the magnetic flux measured by the sensor 10 for the amount of rotation of the rotor 100 in the IPM motor according to the present disclosure. More specifically, the graph in FIG. 8 shows the magnetic flux sensed by the sensor 10 while the rotor 100 rotates a total of 90° from a point A to a point B in FIG. 3. A solid line represents the original magnetic flux of the permanent magnet 140 measured without the cover 300, and a dotted line represents the magnetic flux measured using the cover 300. In addition, at a point P1 and a point P2 at which the rotor 100 is rotated 22.5° and 67.5°, respectively, the sensor 10 reaches the center line C of the slot 130 and the boundary 143 of the permanent magnet 140, respectively. Furthermore, the offset O is not generated at the permanent magnet 140 during the measurement.

As shown in the solid line, when the cover 300 is not used, a change section T of the original magnetic flux of the permanent magnet 140 appears to be gentle and wide around the boundary 413 (that is, the points P1 and P2) at which the magnetic flux becomes zero. Therefore, even when there is no offset O, it may be difficult to accurately detect the boundary 413 and the center line C from such change section T. On the other hand, as indicated by the dotted line, when the cover 300 is applied, by the diversion of the magnetic flux by the window 310 and the bridge 320, the change in the magnetic flux that is the same as that in the original magnetic flux of the permanent magnet 140 as indicated by the solid line is not detected. Instead, total magnetic flux detected near the boundary 413 (that is, the points P1 and P2) at which the magnetic flux becomes zero is greatly increased by the additional magnetic flux generated at the window 310 and the bridge 320. Accordingly, the sudden change in the magnetic flux occurs in a short section near the boundary 413, and accordingly, the boundary 413 and the center line C may be accurately detected. Further, as previously described, the cover 300 prevents the detection of the original magnetic flux of the permanent magnet 140 in a region except for the opening 312 defined at the center line C by the diversion of the magnetic flux by the window 310 and the bridge 320. Therefore, even when the offset O occurs, the same result as the dotted line in FIG. 8 may be obtained. Accordingly, the cover 300 may accurately detect the center line C and the specific position of the rotor 100 even when the offset O occurs.

Effects of the IPM motor according to the present disclosure are as follows.

The IPM motor according to the present disclosure may include the cover mounted on the rotor. The cover may be constructed to guide the magnetic flux of the permanent magnet toward the sensor only at the specific point in the slot of the rotor. On the other hand, the cover may be constructed to divert the magnetic flux of the permanent magnet from the original path, that is, from the sensor at points or regions other than the specific point of the slot. Therefore, the sensor may accurately detect the specific point of the rotor by the cover.

Based on such accurate detection, the current may be supplied to the stator to create the electric field at the appropriate time point, and the constant torque may be applied to the rotor without the interruption. Therefore, while the performance and the efficiency of the motor is greatly increased by the cover of the present disclosure, the noise of the rotor caused by the unstable torque supply may be greatly reduced.

The effects of the present disclosure are not limited to the effects mentioned above. Other effects not mentioned will be apparently and clearly understood by those skilled in the art from the description of the claims.

Although a number of representative examples are described above, it should be understood that numerous other modifications of these examples that fall within the spirit and scope of the principles of this disclosure can be devised by those skilled in the art. More particularly, various variations and modifications are possible within the scope of the disclosure, the drawings and the appended claims. In addition to variations and modifications, alternative uses will also be apparent to those skilled in the art.

What is claimed is:

1. An interior permanent magnet (IPM) motor comprising:
    a stator;
    a rotor that is configured to rotate with respect to the stator and that includes:
        a hub;
        a plurality of spokes that extend outward in a radial direction from the hub;
        a plurality of slots that are defined between the plurality of spokes; and
        a plurality of permanent magnets that are disposed in the plurality of slots, respectively;
    a sensor that is disposed adjacent to the rotor and that is configured to detect a position of each of the plurality of permanent magnets; and
    a cover disposed at a circumferential edge of the rotor and extending along a circumferential direction, the cover at least partially covering the circumferential edge of the rotor and being configured to guide, based on rotation of the rotor with respect to the stator, magnetic flux of each of the plurality of permanent magnets toward the sensor,
    wherein the cover includes a plurality of windows that correspond to the plurality of permanent magnets, respectively, and
    wherein the plurality of windows are disposed on center lines of the plurality of slots, respectively, that extend in the radial direction.

2. The IPM motor of claim 1, wherein each of the plurality of windows includes a magnetic material configured to form a magnetic field that interferes with a magnetic field of each of the plurality of permanent magnets, and
    wherein each of the plurality of windows of the cover is configured to, based on rotation of the rotor with respect to the stator, generate interference with the magnetic field of each of the plurality of permanent magnets, the interference causing (i) the magnetic flux of each of the plurality of permanent magnets to be guided from a first part of the each of the plurality of permanent magnets toward the sensor and (ii) the magnetic flux of the each of the plurality of permanent magnets to be diverted from a second part of the each of the plurality of permanent magnets away from the sensor, the second part being different from the first part.

3. The IPM motor of claim 1, wherein the cover faces the sensor and is disposed between the sensor and the rotor.

4. The IPM motor of claim 1,
    wherein each of the plurality of windows includes:
        a frame that includes a magnetic material configured to form a magnetic field that interferes with a magnetic field of each of the plurality of permanent magnets to thereby induce, away from the sensor, a path of the magnetic flux of a permanent magnet that corresponds to the window; and
        an opening that is located over the permanent magnet and defined in the frame, the opening being free of a magnetic material to thereby not interfere with the magnetic field of each of the plurality of permanent magnets and pass, toward the sensor, the magnetic flux of the permanent magnet that corresponds to the window.

5. The IPM motor of claim 4, wherein the cover includes a plurality of bridges, and wherein each of the plurality of bridges is disposed on a permanent magnet that corresponds to the bridge, and extends, in a circumferential direction, from a window that corresponds to the bridge.

6. The IPM motor of claim 5, wherein each of the plurality of bridges includes first and second bridge portions that are arranged at opposite sides of a window and extend in opposite directions with respect to the window, and wherein each of the plurality of bridges includes the magnetic material configured to form a magnetic field interfering with the magnetic field of each of the plurality of permanent magnets to thereby, and is configured to induce, away from the sensor, magnetic flux of at least a portion of a permanent magnet that is spaced apart from the bridge.

7. The IPM motor of claim 6, wherein the first and second bridge portions are arranged at opposite sides of a window that corresponds to the bridge, and that extend, in the circumferential direction, toward opposite sides of a permanent magnet that corresponds to the bridge.

8. The IPM motor of claim 5, wherein the sensor is configured to move relative to the rotor along a path that is defined based on rotation of the rotor, wherein the plurality of windows and the plurality of bridges are disposed along the path.

9. The IPM motor of claim 5, wherein the cover includes a plurality of yokes, and wherein each of the plurality of yokes extends, in the circumferential direction, on a spoke that corresponds to the yoke and that is connected to two adjacent bridges.

10. The IPM motor of claim 9, wherein each of the plurality of yokes defines a hole that is aligned with a through hole that is defined in a spoke that corresponds to the yoke.

11. The IPM motor of claim 9, wherein each of the plurality of yokes partially exposes opposite lateral sides of a corresponding spoke in the circumferential direction.

12. The IPM motor of claim 5, wherein each of the plurality of bridges has a width of less than 1.5 mm in the radial direction.

13. The IPM motor of claim 4, wherein the opening of each of the plurality of windows is defined at a position between (i) a first point that corresponds to $3/4$ of a radial length from an innermost end of a corresponding permanent magnet and (ii) a second point that corresponds to an outermost end of the corresponding permanent magnet.

14. The IPM motor of claim 4, wherein the opening of each of the plurality of windows has a width of less than 1.5 mm in the circumferential direction.

15. The IPM motor of claim 1, wherein the stator circumferentially surrounds the rotor.

16. The IPM motor of claim 1, wherein the plurality of spokes are equally spaced apart from each other in a circumferential direction.

17. The IPM motor of claim 1, further comprising:
a driving shaft that is connected to the hub.

18. The IPM motor of claim 1, wherein the sensor includes a hall sensor.

* * * * *